US011452282B2

(12) United States Patent
Hoffpauir (10) Patent No.: US 11,452,282 B2
(45) Date of Patent: Sep. 27, 2022

(54) CRAWFISH TRAP BAIT GUARD SYSTEM AND METHOD

(71) Applicant: S & K INNOVATIONS, LLC, Bell City, LA (US)

(72) Inventor: Stephen Wayne Hoffpauir, Bell City, LA (US)

(73) Assignee: S & K INNOVATIONS, LLC, Bell City, LA (US)

(*) Notice: Subject to any disclaimer, the term of this patent is extended or adjusted under 35 U.S.C. 154(b) by 480 days.

(21) Appl. No.: 16/393,453

(22) Filed: Apr. 24, 2019

(65) Prior Publication Data

US 2020/0337283 A1  Oct. 29, 2020

(51) Int. Cl.
*A01K 69/10* (2006.01)
*A01K 69/00* (2006.01)
*A01K 69/06* (2006.01)
*A01K 69/08* (2006.01)
*A01K 75/00* (2006.01)

(52) U.S. Cl.
CPC .............. *A01K 69/10* (2013.01); *A01K 69/00* (2013.01); *A01K 69/08* (2013.01); *A01K 75/00* (2013.01)

(58) Field of Classification Search
CPC ........ A01K 69/00; A01K 69/06; A01K 69/08; A01K 69/10
USPC .................. 43/100, 102, 103, 105; 220/475; 248/146
See application file for complete search history.

(56) References Cited

U.S. PATENT DOCUMENTS

| | | | | | |
|---|---|---|---|---|---|
| 55,635 | A | * | 6/1866 | Field ...................... | A01K 69/06 43/105 |
| 237,231 | A | * | 2/1881 | Atkinson ............... | A01K 69/06 43/105 |
| 363,858 | A | * | 5/1887 | Steward ................ | A01M 21/00 43/65 |
| 411,746 | A | * | 9/1889 | Hurst .................... | A01M 21/00 43/65 |
| 492,123 | A | * | 2/1893 | Tinsley ................. | A01K 69/06 43/100 |
| 527,435 | A | * | 10/1894 | Loud, Jr. ............... | A01M 21/00 43/65 |
| 616,924 | A | * | 1/1899 | Heberling ............. | A01K 97/05 43/56 |
| 833,737 | A | * | 10/1906 | Franklin ............... | A01M 21/00 43/65 |
| 846,556 | A | * | 3/1907 | Dollar ................... | A01K 69/06 43/100 |

(Continued)

FOREIGN PATENT DOCUMENTS

| | | | | | |
|---|---|---|---|---|---|
| CA | | 1160450 A | * | 1/1984 | ............ A01K 69/08 |
| CA | | 2168618 A1 | * | 8/1997 | ............ A01K 69/08 |

(Continued)

*Primary Examiner* — Darren W Ark
(74) *Attorney, Agent, or Firm* — Keaty Law Firm LLC (57) ABSTRACT

A crawfish trap bait guard which, in use, is mounted upon the staking rod of a crawfish trap, inside the mesh of the crawfish trap, above the floor of the trap, and below the water line. The crawfish trap bait guard encloses the bait in such a way as to prevent the access of birds and fish to the bait, while allowing crawfish within the trap to obtain managed portions of the bait by reaching through calibrated open areas distributed around the crawfish trap bait guard so as to allow a large number of crawfish to feed at the same time.

21 Claims, 5 Drawing Sheets

(56) References Cited

U.S. PATENT DOCUMENTS

| | | | | |
|---|---|---|---|---|
| 1,079,576 A * | 11/1913 | Noyes | A01K 69/08 | 43/65 |
| 1,167,732 A * | 1/1916 | Whelen | A01K 69/06 | 29/605 |
| 1,188,185 A * | 6/1916 | Krulish | A01K 69/06 | 43/105 |
| 1,607,443 A * | 11/1926 | Cormier | A01K 69/08 | 43/65 |
| 1,670,039 A * | 5/1928 | Lewis | A01K 69/08 | 43/100 |
| 1,887,059 A * | 11/1932 | Kraus | A01K 69/08 | 43/105 |
| 1,927,599 A * | 9/1933 | Smith | A01M 23/00 | 43/103 |
| 2,123,471 A * | 7/1938 | Lewis | A01M 23/00 | 43/100 |
| 2,165,516 A * | 7/1939 | Stein | A01K 73/12 | 43/105 |
| 2,196,928 A * | 4/1940 | Lile | A01K 69/08 | 43/100 |
| 2,218,843 A * | 10/1940 | Fuller, Jr. | A01K 69/06 | 43/105 |
| 2,316,888 A * | 4/1943 | Schreyer | A01K 69/06 | 43/66 |
| 2,501,895 A * | 3/1950 | Gayle | B65F 1/141 | 248/156 |
| 2,522,778 A * | 9/1950 | Cannon | B65F 1/141 | 248/156 |
| 2,602,261 A * | 7/1952 | Mann | A01K 69/06 | 43/100 |
| 2,603,030 A * | 7/1952 | Pape | A01K 97/04 | 43/105 |
| 2,639,540 A * | 5/1953 | Buford | A01K 69/06 | 43/102 |
| 2,726,478 A * | 12/1955 | Pullen | A01K 69/08 | 43/100 |
| 2,726,479 A * | 12/1955 | Huse | A01K 69/08 | 43/102 |
| 2,731,761 A * | 1/1956 | Marshall | A01K 69/08 | 43/100 |
| 2,736,986 A * | 3/1956 | Goldstein | A01K 69/06 | 43/103 |
| 2,741,063 A * | 4/1956 | McCallum | A01K 69/08 | 43/66 |
| 2,760,297 A * | 8/1956 | Buyken | A01K 69/08 | 43/105 |
| 2,894,354 A * | 7/1959 | Thomas | A01K 69/06 | 43/101 |
| 2,908,993 A * | 10/1959 | Webb | A01K 69/08 | 43/44.99 |
| 2,910,801 A * | 11/1959 | Safarik | A01K 69/08 | 43/105 |
| 2,918,749 A * | 12/1959 | Alberts | A01K 69/06 | 43/102 |
| 3,176,427 A * | 4/1965 | Hershey | A01K 69/08 | 43/100 |
| 3,318,039 A * | 5/1967 | James | A01K 69/08 | 43/100 |
| 3,319,373 A * | 5/1967 | Gale | A01K 69/08 | 43/100 |
| 3,337,982 A * | 8/1967 | Sajulan | A01K 69/08 | 43/65 |
| 3,373,523 A * | 3/1968 | Olafson | A01K 69/08 | 43/100 |
| 3,440,758 A * | 4/1969 | Prince | A01K 69/10 | 43/100 |
| 3,497,989 A * | 3/1970 | Manno | A01K 69/08 | 43/100 |
| 3,605,320 A * | 9/1971 | Wells | A01K 69/08 | 43/65 |
| 3,699,702 A * | 10/1972 | Lankenau | A01K 69/08 | 43/100 |
| 3,740,892 A * | 6/1973 | Cox | A01K 69/08 | 43/100 |
| 3,842,529 A * | 10/1974 | Richard | A01K 97/02 | 43/44.99 |
| 3,855,727 A * | 12/1974 | Canoy | A01M 1/02 | 43/65 |
| 3,906,655 A * | 9/1975 | Lowenthal, Jr. | A01K 69/08 | 43/100 |
| 3,908,853 A * | 9/1975 | Keesling | B65F 1/141 | 220/908 |
| 4,030,232 A * | 6/1977 | Niva | A01K 69/08 | 43/105 |
| 4,147,130 A * | 4/1979 | Goguel | A01K 61/80 | 119/223 |
| 4,177,601 A * | 12/1979 | Morton | A01K 69/08 | 43/102 |
| 4,182,068 A * | 1/1980 | Iannucci | A01K 69/06 | 248/505 |
| 4,184,283 A * | 1/1980 | Wyman | A01K 69/06 | 43/102 |
| 4,221,070 A * | 9/1980 | Swindell | A01K 69/08 | 43/100 |
| 4,237,646 A * | 12/1980 | Mims, III | A01K 69/06 | 43/10 |
| 4,373,286 A * | 2/1983 | Robison | A01K 69/00 | 43/10 |
| 4,409,752 A * | 10/1983 | Anderson | A01K 69/10 | 43/102 |
| 4,424,641 A * | 1/1984 | Kyte | A01K 69/08 | 119/208 |
| 4,434,575 A * | 3/1984 | Pearson | A01K 69/06 | 43/100 |
| 4,447,978 A * | 5/1984 | Robison | A01K 69/00 | 43/10 |
| 4,452,005 A * | 6/1984 | Poirot | A01K 69/06 | 43/100 |
| 4,473,967 A * | 10/1984 | Poirot | A01K 69/06 | 43/100 |
| 4,554,759 A * | 11/1985 | Edling | A01K 69/08 | 119/213 |
| 4,563,832 A * | 1/1986 | Drebot | A01K 97/045 | 43/102 |
| 4,565,027 A * | 1/1986 | Sato | A01K 69/08 | 43/102 |
| 4,611,424 A * | 9/1986 | Tarantino | A01K 69/08 | 43/100 |
| 4,638,588 A * | 1/1987 | Abadie | A01K 61/80 | 43/44.99 |
| 4,648,199 A * | 3/1987 | Deaton | A01K 69/08 | 43/100 |
| 4,759,149 A * | 7/1988 | Dunn | A01K 69/08 | 43/102 |
| 4,765,088 A * | 8/1988 | Stuart | A01K 69/06 | 43/100 |
| 4,765,089 A * | 8/1988 | Rowe | A01K 69/06 | 43/102 |
| 4,843,756 A * | 7/1989 | Wyman | A01K 69/06 | 43/102 |
| 4,848,025 A * | 7/1989 | Wyman | A01K 69/06 | 43/102 |
| 4,905,405 A * | 3/1990 | Hendricks | A01K 69/08 | 43/100 |
| 4,914,856 A * | 4/1990 | Kennedy | A01K 69/00 | 43/100 |
| 4,924,622 A * | 5/1990 | Goreham | A01K 69/06 | 43/100 |
| 4,956,935 A | 9/1990 | Riddell | | |
| 5,133,149 A * | 7/1992 | Smyly, Sr. | A01K 69/06 | 43/100 |
| 5,142,808 A * | 9/1992 | Dupree, Jr | A01K 69/06 | 119/213 |
| 5,157,864 A * | 10/1992 | Kuroda | A01K 69/06 | 43/100 |
| 5,168,653 A * | 12/1992 | Wyman | A01K 69/06 | 43/100 |

(56) References Cited

U.S. PATENT DOCUMENTS

| | | | | |
|---|---|---|---|---|
| 5,174,059 A * | 12/1992 | Durbin | A01K 69/06 | 43/100 |
| 5,237,768 A * | 8/1993 | Kiekhafer | A01K 69/10 | 43/11 |
| 5,259,809 A * | 11/1993 | Rainey, Jr. | A01K 69/06 | 119/213 |
| 5,353,541 A * | 10/1994 | Jonason | A01K 69/10 | 43/100 |
| 5,842,304 A * | 12/1998 | Rivera | A01K 69/06 | 43/105 |
| 5,894,951 A * | 4/1999 | Hunt | A63B 47/007 | 206/315.9 |
| 6,000,168 A * | 12/1999 | Demusz | A01K 69/06 | 43/55 |
| 6,035,575 A * | 3/2000 | Hilty | A01K 69/06 | 43/100 |
| 6,247,264 B1 * | 6/2001 | Prosol | A01K 69/06 | 43/100 |
| 6,327,809 B1 * | 12/2001 | Comes | A01K 69/00 | 43/61 |
| 6,338,419 B1 * | 1/2002 | Penney | A47G 7/06 | 220/475 |
| 6,591,544 B1 * | 7/2003 | Christian | A01K 69/06 | 43/100 |
| 6,786,000 B1 | 9/2004 | Hong | | |
| 6,804,911 B1 * | 10/2004 | Henke | A01K 69/06 | 43/100 |
| 7,111,427 B1 * | 9/2006 | Gaughen | A01K 69/06 | 43/100 |
| 7,503,141 B1 * | 3/2009 | Leeman | A01K 69/06 | 43/100 |
| 7,610,716 B2 * | 11/2009 | Philbrook | A01K 69/10 | 135/126 |
| 7,726,064 B2 * | 6/2010 | Harju | A01K 69/10 | 43/105 |
| 8,015,748 B2 | 9/2011 | Teo | | |
| 8,117,783 B2 * | 2/2012 | Hilty | A01K 69/06 | 43/100 |
| 8,402,689 B2 * | 3/2013 | Stearns | A01K 69/08 | 43/105 |
| 8,661,727 B2 * | 3/2014 | Alfarhan | A01M 23/20 | 43/63 |
| 9,549,539 B2 * | 1/2017 | Anderson | A01K 69/06 | |
| 9,781,910 B1 * | 10/2017 | Burrell | A01K 69/08 | |
| 10,117,422 B2 * | 11/2018 | Hunt | A01K 69/08 | |
| 10,499,621 B1 * | 12/2019 | Gibson | A01K 69/10 | |
| 10,548,303 B2 * | 2/2020 | Scaglione | A01K 69/10 | |
| 10,834,911 B2 * | 11/2020 | Hutchinson | A01K 97/05 | |
| 10,881,087 B1 * | 1/2021 | Poulsen | A01K 99/00 | |
| 10,925,266 B2 * | 2/2021 | Gittings | A01K 69/10 | |
| 11,046,401 B2 * | 6/2021 | Fiorello | B63G 8/22 | |
| 2004/0181995 A1 * | 9/2004 | Cheramie | A01K 69/10 | 43/105 |
| 2005/0005501 A1 * | 1/2005 | Hong | A01K 69/10 | 43/105 |
| 2005/0223624 A1 * | 10/2005 | Gaughen | A01K 69/06 | 43/100 |
| 2006/0042065 A1 * | 3/2006 | Matherne | A01K 69/06 | 29/428 |
| 2010/0251599 A1 * | 10/2010 | Cummins | A01K 97/04 | 43/100 |
| 2013/0047489 A1 * | 2/2013 | Walker | A01K 97/01 | 43/4.5 |
| 2013/0276351 A1 * | 10/2013 | Williams | A01K 97/04 | 43/100 |
| 2014/0305026 A1 * | 10/2014 | Pemberton | A01K 69/06 | 43/100 |
| 2015/0334999 A1 * | 11/2015 | Blakey | A01K 69/06 | 43/4.5 |
| 2016/0106079 A1 * | 4/2016 | Best | A01K 97/05 | 43/102 |
| 2017/0231206 A1 * | 8/2017 | Park | A01K 69/10 | 43/105 |
| 2020/0198743 A1 * | 6/2020 | Fiorello | A01K 69/08 | |
| 2020/0214275 A1 * | 7/2020 | Brawn | A01K 69/08 | |
| 2021/0015085 A1 * | 1/2021 | Hutchinson | A01K 97/05 | |
| 2021/0144980 A1 * | 5/2021 | Klokkersund | A01K 69/08 | |

FOREIGN PATENT DOCUMENTS

| | | | | |
|---|---|---|---|---|
| CA | 2425964 C * | 8/2006 | | A01K 69/06 |
| CA | 2899637 A1 * | 6/2016 | | A01K 69/10 |
| CA | 2899637 C * | 7/2017 | | A01K 69/06 |
| EP | 3183958 A4 * | 5/2018 | | A01K 69/06 |
| FR | 382534 A * | 2/1908 | | A01K 69/06 |
| FR | 568119 A * | 3/1924 | | A01K 69/08 |
| FR | 1433759 A * | 4/1966 | | A01K 69/08 |
| FR | 2371140 A1 * | 6/1978 | | A01K 69/08 |
| FR | 2720225 A1 * | 12/1995 | | A01K 69/10 |
| GB | 2281181 A * | 3/1995 | | A01K 69/06 |
| JP | 05211830 A * | 8/1993 | | |
| JP | 07008142 A * | 1/1995 | | |
| JP | H075355 U * | 1/1995 | | |
| JP | H0739417 U * | 7/1995 | | |
| JP | 09215463 A * | 8/1997 | | |
| JP | 2651899 B2 * | 9/1997 | | |
| JP | 2001238570 A * | 9/2001 | | |
| JP | 2003210073 A * | 7/2003 | | |
| JP | 2006109836 A * | 4/2006 | | |
| JP | 5291242 B1 * | 9/2013 | | |
| KR | 20040051083 A * | 6/2004 | | |
| KR | 20040051084 A * | 6/2004 | | |
| KR | 100474813 B1 * | 3/2005 | | |
| KR | 200417633 Y1 * | 6/2006 | | |
| KR | 200421101 Y1 * | 7/2006 | | |
| KR | 200425599 Y1 * | 9/2006 | | |
| KR | 200427603 Y1 * | 9/2006 | | |
| KR | 20070000903 U * | 8/2007 | | |
| KR | 100805678 B1 * | 2/2008 | | |
| KR | 20090013148 A * | 2/2009 | | |
| KR | 20100001681 U * | 2/2010 | | |
| KR | 20100033640 A * | 3/2010 | | |
| KR | 20100042951 A * | 4/2010 | | |
| KR | 200449587 Y1 * | 7/2010 | | |
| KR | 20100013065 U * | 12/2010 | | |
| KR | 200454136 Y1 * | 6/2011 | | |
| KR | 20110073133 A * | 6/2011 | | |
| KR | 20110080115 A * | 7/2011 | | |
| KR | 200455448 Y1 * | 9/2011 | | |
| KR | 101104115 B1 * | 1/2012 | | |
| KR | 101188334 B1 * | 10/2012 | | |
| KR | 200463432 Y1 * | 11/2012 | | |
| KR | 101337828 B1 * | 12/2013 | | |
| KR | 101495008 B1 * | 2/2015 | | |
| KR | 101502289 B1 * | 3/2015 | | |
| RU | 2055474 C1 * | 3/1996 | | |
| RU | 2064258 C1 * | 7/1996 | | |
| SU | 1324608 A1 * | 7/1987 | | |
| SU | 1346090 A1 * | 10/1987 | | |
| WO | WO-0243479 A3 * | 8/2003 | | A23K 50/80 |
| WO | WO-2006074602 A1 * | 7/2006 | | A01K 69/06 |
| WO | WO-2007043948 A1 * | 4/2007 | | A01K 69/08 |
| WO | WO-2009145639 A1 * | 12/2009 | | A01K 69/10 |
| WO | WO-2017042786 A1 * | 3/2017 | | A01K 69/08 |

* cited by examiner

CRAWFISH TRAP BAIT GUARD SYSTEM AND METHOD

BACKGROUND OF THE INVENTION

This invention provides a crawfish trap bait guard for use with a crawfish trap.

Crawfish, or crayfish, are of increasing importance as a food. Commercially, crawfish are raised in flooded fields, in water very roughly 18 inches deep and varying with excessive rain or drought. Crawfish traps are placed at intervals in the flooded fields. The usual type of trap is called a "pyramid trap" and has a wire mesh enclosure bent into a pyramidal or conical shape with a section of large tubing attached to the top to allow placing bait into the trap and emptying trapped crawfish. The trap is situated with the greater part of the wire mesh under the water surface and the top piece above the water. The trap is fixed to the underlying wet ground with a staking rod, which is usually fixed to the top piece, extending substantially vertically through the wire mesh enclosure and several inches into the ground.

Commercially, the flooded fields are serviced on a schedule by flat-bottomed boats from which the traps are initially deployed and are then periodically emptied of trapped crawfish, refilled with bait, and redeployed. The traps are usually lifted out of the water for these procedures.

Crawfish traps are baited with cut-up fish parts, with sticks of dried and compressed food particles, and with both, depending on time of the season and other conditions. A significant problem presently is the taking of the bait by birds, particularly cranes, from the top, and by fish and amphibians from the bottom. Also, some crawfish are able to access the bait from outside of the trap. It is common to see cranes wading behind and following a workboat, and taking the bait out of the trap moments after it is put in.

When a crawfish trap runs out of bait early, before the scheduled refilling, the hungry crawfish trapped inside are likely to either try, with some success, to get out of the trap, or to eat each other.

What is therefore needed is a system and method, using existing crawfish traps, for preventing the access of birds, fish, and outside crawfish to the bait, while allowing crawfish within the trap to access the bait.

US Patent Application Publication No. 2013/0047489 for a "Fishing Apparatus and Method," published on Feb. 28, 2013 by inventor Michael F. Walker, discloses a fishing apparatus including a submersible central pole having a first end and also a weighted, second end. Floatable hinged ribs radiate from the first end of the central pole. Fabric disposed on the floatable hinged ribs becomes stretched over the floatable hinged ribs as the ribs go from a collapsed disposition adjacent the central pole to an open disposition radiating outwardly from the first end of the central pole. In particular, the fishing apparatus 10 includes a submersible central pole 12 having a first end 14 and an opposite, weighted second end 16. The central pole 12 may be of multiple piece construction. For example, the central pole 12 may include two jointed pole pieces 18, 20 that are held together by a shock cord retainer 22. Alternatively, the pole pieces may be arranged in a telescoping relationship. The multiple piece construction of the central pole allows the central pole to be collapsed for easier storage and transportation of the fishing apparatus. The second end 16 of the central pole 12 may include a feature such as a point 24 or similar to maintain placement of the fishing apparatus on a bottom surface as described in more detail below. The second end 16 may also be weighted to further maintain placement of the fishing apparatus during use. Optionally, a line 36 may be attached to the first end 14 of the central pole 12. A user can grasp the line to pull the fishing apparatus 10 up to the water surface from a submerged disposition when it is desired to remove the fishing apparatus from the water. The stretched fabric 34 establishes an area of cover for fish 52 to provide the fish with their preferred habitat. Interchangeable baits 54 such as decoy fish may be suspended from or attached to the ribs 26 and/or fabric 34 of the apparatus 10 to facilitate luring fish 52 to the area of cover underneath the structure. A fishing hole 46 is drilled in the ice 40 beyond the perimeter of the stretched fabric 34 for insertion of a fishing line 48 into the water 42. An ice fisher drops the fishing line 48 through the fishing hole 46 and catches fish 52 that have been lured to and are swimming in the vicinity of the fishing apparatus 10. After fishing, the apparatus 10 is brought back to the ice 40 surface by pulling on the line 36. As the apparatus 10 ascends, the force of the water 42 against the upper surface of the fabric 34 causes the hinged ribs 26 to resume the collapsed disposition adjacent the central pole 12. The apparatus 10 is removed from the water by pulling the central pole 12 through the hole 38.

U.S. Pat. No. 8,015,748 for a "Collapsible Trap," issued on Sep. 13, 2011 to inventor Lian Hing Teo, provides for a collapsible trap 10 particularly suitable as a crab pot for trapping crabs. The collapsible trap 10 comprises a frame structure 13 having a central axis and pliant material such as netting 15 attached to the frame structure 13. A haul line 11 is connected to the frame structure 13. The frame structure 13 comprises a plurality of elongate frame elements 31. The frame structure 13 is moveable between a retracted condition in which the frame elements 31 extend generally parallel to central axis and an extended condition in which the frame elements 31 extend outwardly of the central axis giving form and shape to the netting 15 to provide an enclosure 17 defining an entrapment zone 19. When the frame structure 13 is in the retracted condition, the netting 15 can be wrapped about the frame structure 13 to assume a compact condition for storage and transportation. In one arrangement, the enclosure 17 is configured as a cage having several entry openings 27 through which crabs can enter the enclosure 17, and an access way 81 incorporating an opening 83 for retrieval of crabs trapped within the enclosure 17. Of particular note, the crab pot 10 may have provision to accommodate a bait for attracting crabs into the enclosure 17. In this embodiment, the bait is contained within a bait bag 101 adapted to be suspended within the enclosure 17. The bait bag 101 is configured as a wrapper 103 within which the bait is confined. The wrapper 103 comprises several sheet layers of mesh material 104 wrapped about the bait and twisted at opposed ends 105 in a manner similar to a confectionery wrapper. Ties 107 are attached to a twisted ends of the wrapper 103 for the purposes of suspending the bait bag within the enclosure 17. Typically, one tie 107 would be attached to the underside of the (bottom) actuating yoke 61 and the other tie would be attached to the mesh panel 22 defining the bottom 21 of the enclosure.

U.S. Pat. No. 6,247,264 for a "Sea Trap and Method of Use," issued on Jun. 19, 2001 to inventor Mikhail I. Prosol, provides for a sea trap 20 including a first jaw 22 which cooperates with a second jaw 24. Jaws 22 and 24 are connected to a base 30, and the jaws 22 and 24, and the base 30 are covered with an animal-retaining enveloping material 26 such as netting. Jaws 22 and 24 are biased by springs 32 and 34 to a closed animal-retaining state. The sea trap 20 is placed in an open animal-receiving state and a trigger mechanism 28 is armed. An animal 500 activates the trigger mechanism 28 thereby causing the sea trap 20 to rapidly close to the animal-retaining state and capturing the animal 500 within the enveloping material 26. In a preferred embodiment sea trap 20 is used in a body of water 502 to trap marine animals 500. In this embodiment a float 50 provides a visual indication that sea trap 20 has been closed and an animal 500 captured.

U.S. Pat. No. 5,842,304 for a "Foldable Crab Trap Having a Bait Bag," issued on Dec. 1, 1998 to inventor Raymond Rivera, provides for a foldable crab trap for catching crabs which includes a central hinge member, a central frame member connected to the central hinge member, and a pair of outer frame members each having crab nets. The outer frame members are movable relative to the central hinge member between an open position wherein the outer frame members are in the same plane for receiving crabs, and a closed position wherein the outer frame member are parallel to each other for trapping crabs. A tension line is connected to the outer ends of the outer frame members and to the outer end of the central frame member for moving the outer frame members to the closed position. The tension line has a free end adapted to be held under tension by the crab catcher for signaling the crab catcher when a crab is present in the crab trap. A bait bag containing bait is connected under tension to the central frame member so that when a crab nibbles on the bait it causes movement of the central frame member and movement of the tension line to signal the crab catcher that a crab is present in the crab trap, and so that the crab catcher may pull on the tension line for moving the outer frame members to the closed position and for lifting the crab trap out of the water.

U.S. Pat. No. 4,956,935 for a "Spring Powered Crab Net," issued on Sep. 18, 1990 to inventor Henry N. Riddell, provides for a plurality of rigid rods centrally connected to a hub block and peripherally connected to flexible drawstrings which in turn support a net. The rods are of sufficient length to cause the hub block to be located directly above and over the center of the net and are connected to the hub block by means of any suitable type of spring. A bait spike allows placement of any bait, suitable for attracting crabs, into such a position that the bait will be located directly above and in the center of the net. A retrieval line is attached to the hub block so that upward force on the line causes the springs to partially deform which in turn allows the net to slide downward along the draw strings thereby forming a pouch in the net. This pouch allows for entrapment of the crab for retrieval of the crab fisherman.

U.S. Pat. No. 4,177,601 for a "Floated Bag Trap," issued on Dec. 11, 1979 to inventor Roger H. Morton, provides for a trap for fish, crabs and the like, characterized by a substantial portion thereof being flexible and collapsible for increasing capacity while facilitating storage, safety and handling. The trap comprises an enclosure defined by a large flexible net secured to and communicating with a smaller and substantially rigid base carrying a bait well. Affixed to the net is flotation means whereby the net expands upwardly while under water increasing capacity while properly aligning the base on the underwater floor. Means are provided in the enclosure for baiting the bait well, for entrance of fish, crabs and the like and for emptying the trap. Location and retrieval means are affixed to the trap for retrieval, preferably base first.

U.S. Pat. No. 6,786,000 for a "Pocketed Hoop Net," issued on Sep. 7, 2004 to inventor Ben Hong, provides for a pocketed crab and lobster hoop net comprising a larger outer upper ring, a smaller inner lower ring, and located inside the outer upper ring when the net is laid flat on the sea floor. An intermediate net is woven of mesh between the rings. The mesh conforms to the rings and forms a net having selvage woven around rings retaining the mesh to the ring. A first central net is woven inside the inner lower ring. A second central net is woven inside the inner lower ring parallels the first central net sharing a majority of common selvage. The cord defining a chord and forms an arc shaped pocket opening in cooperation with a first central net, the pocket definition cord having two opposite ends attached to two end points near the circumference of the inner lower ring. A bait pocket is formed between the slack of the second central net and first central net, the pocket capable of holding bait pleasing to crustaceans. Of particular note, a second central net and first central net are not pulled entirely taught but have enough slack to form a bait pocket. The pocket can hold bait pleasing to crustaceans, such as a fish head or chicken wings. The pocket opening definition cord may be semi elastic or pulled taught to prevent bait from falling out of the pocket.

U.S. Pat. No. 4,409,752 for a "Crab Trap and Methods for Making and Using," issued on Oct. 18, 1983 to inventor George L. Anderson, provides for a frustoconical crab trap suitable for catching crustaceans, such as crabs, including a buoyant entryway collar into which a woven mesh is cast or molded. The net defines an otherwise closed solid and passes around or encircles a tubular member generally in the form of a closed, endless loop. In operation, the crab trap of this invention is lowered to the ocean floor, where the loop rests on the floor of the ocean while the foam collar automatically floats above the base. The trap presents a substantially equally attractive profile to a crab which approaches the trap from any direction.

SUMMARY OF THE INVENTION

This invention provides a crawfish trap bait guard which, in use, is mounted upon the staking rod of a crawfish trap, inside the mesh of the crawfish trap, above the floor of the trap, and below the water line. The crawfish trap bait guard encloses the bait in such a way as to prevent the access of birds and fish to the bait, while allowing crawfish within the trap to obtain managed portions of the bait by reaching through calibrated open areas distributed around the crawfish trap bait guard so as to allow a large number of crawfish to feed at the same time.

BRIEF DESCRIPTION OF THE DRAWINGS

Reference will now be made to the drawings, wherein like parts are designated by like numerals, and wherein.

DETAILED DESCRIPTION OF THE INVENTION

Figure 1:
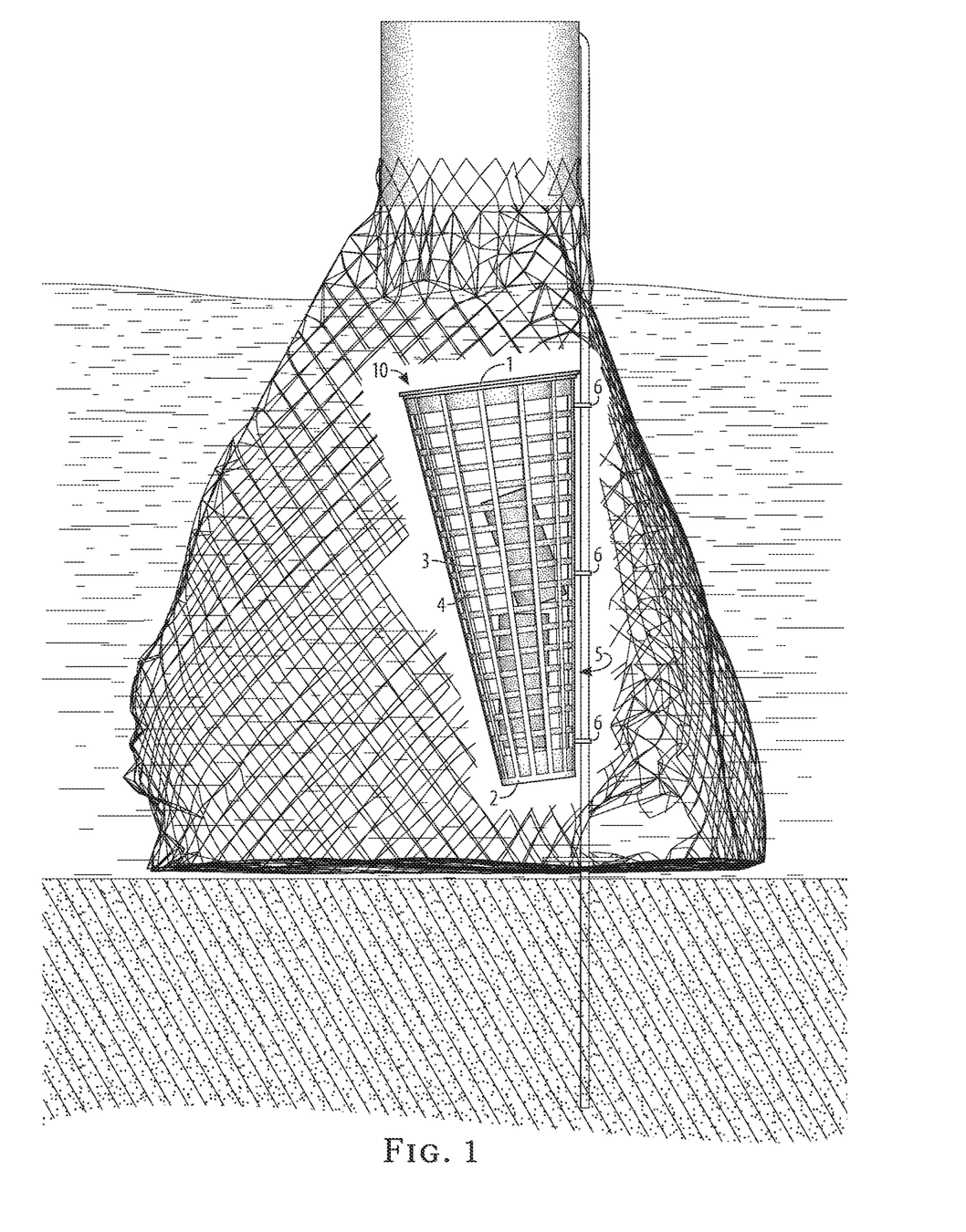
FIG. 1 is a side-view schematic of the crawfish trap bait guard of the invention, in use.

Referring to schematic FIG. 1, the crawfish trap bait guard 10, in use, is mounted upon the staking rod of a crawfish trap, inside the mesh of the crawfish trap, above the floor of the trap, and below the water surface. The crawfish trap bait guard 10 encloses the bait in such a way as to prevent the access of birds, fish, and amphibians to the bait, while allowing crawfish within the trap to obtain managed portions of the bait by reaching through calibrated open areas distributed around the crawfish trap bait guard 10 so as to allow a large number of crawfish to feed at the same time.

Figure 4:
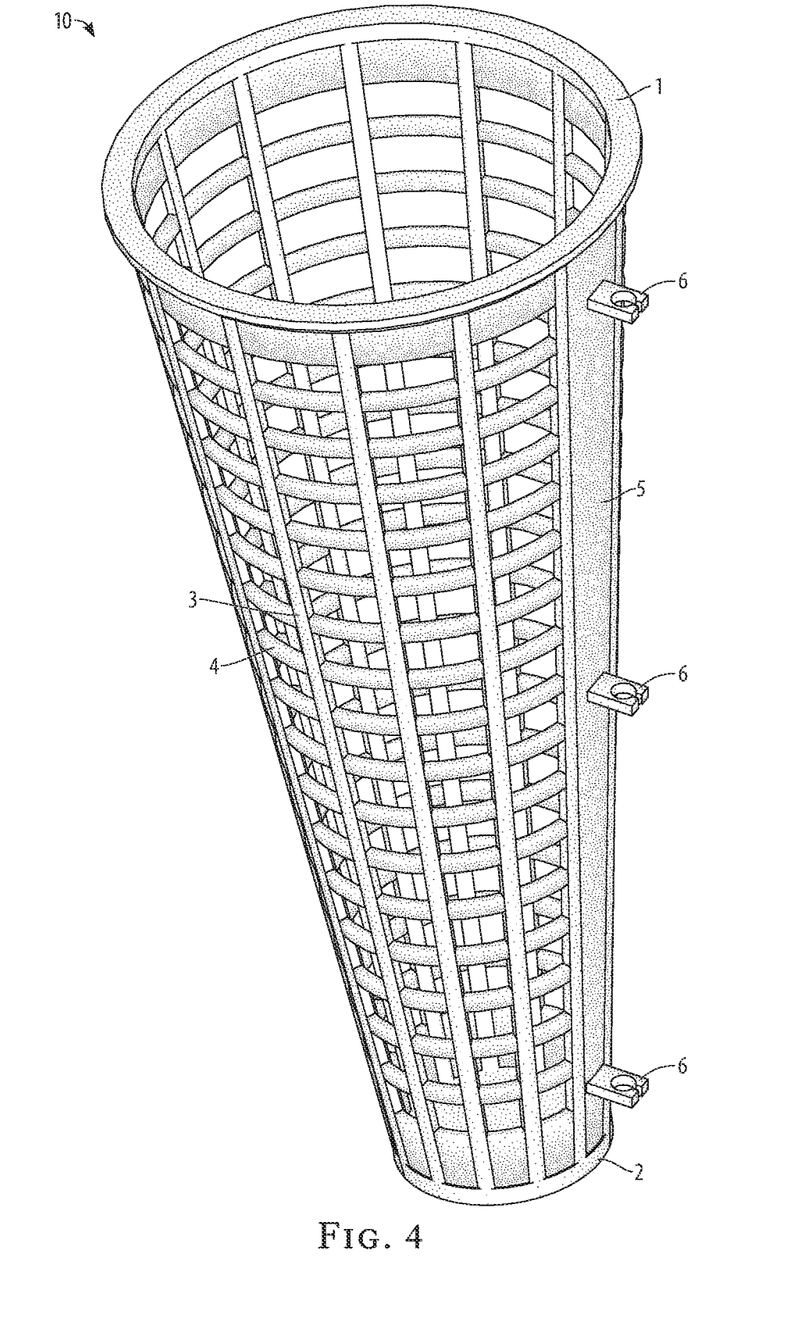
FIG. 4 is a perspective view of the crawfish trap bait guard of the invention.
Figure 5:
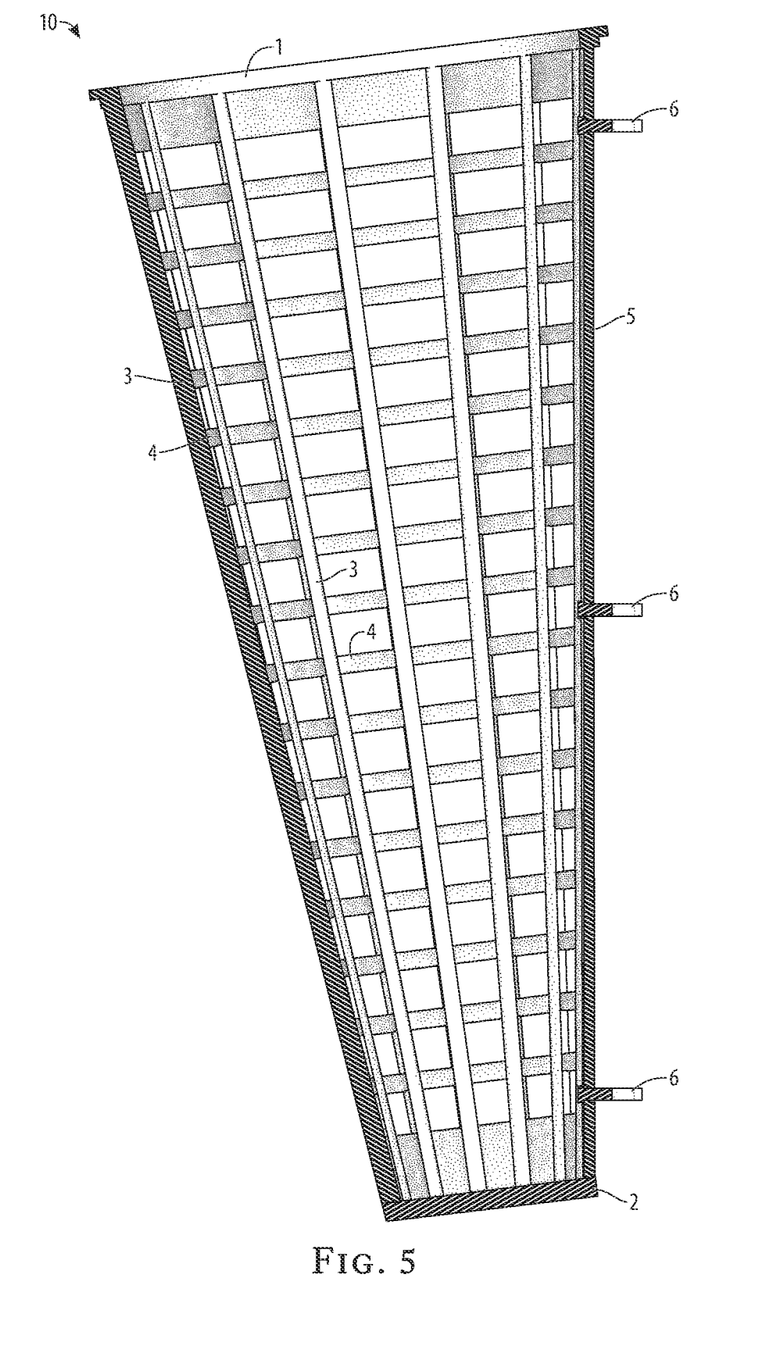
FIG. 5 is a section view of the crawfish trap bait guard of the invention.

Referring additionally to perspective FIG. 4 and sectional FIG. 5, a top collar 1 is provided, which defines a top opening of the crawfish trap bait guard 10. This top opening is usually sized from 4 to 6 inches inclusive, and the rest of the pieces are sized accordingly, in order to provide a crawfish trap bait guard 10 of the proper size to fit within existing crawfish traps, to hold an adequate amount of bait, and to position the bait away from access outside the trap. Working prototypes of the crawfish trap bait guard 10 have the rough dimensions of 5 inches diameter at the top collar 1, 2 inches diameter at the bottom piece 2, and 12 inches overall length, with 12 longitudinal struts and with 16 bands of latitudinal struts 4.

The crawfish trap bait guard 10 can have a round, oval, or polygonal shape, without significantly affecting its function. The crawfish trap bait guard 10 can be manufactured from a waterproof and semi-rigid plastic, composite, or metal material.

A bottom piece 2 is provided as a bottom end and as an attachment structure for a number of longitudinal struts 3 running from attachments at the top collar 1 to attachments at the bottom piece 2. The bottom piece 2 is sized smaller than the top collar 1, resulting in an overall taper of the crawfish trap bait guard 10. The number of longitudinal struts 3 used is dependent upon the size of the top collar 1, and should result in the spacing of longitudinal struts at a distance approaching, but not exceeding, one inch at the top collar 1.

A number of latitudinal struts 4 are attached to the longitudinal struts 3 from top to bottom at a spacing approaching, but not exceeding, one-half inch. The longitudinal and latitudinal struts define a tapered basket having openings of size not exceeding one inch by one-half inch. The size of these openings allows a crawfish close to the basket to reach in and pinch off a portion of bait, which the crawfish then passes to its mouth. The crawfish is therefore allowed access to the bait, but is prevented from taking too much bait at one time. This controlled access to the bait helps ensure that the bait will last longer and will be available to a larger number of crawfish within the trap. The existence of many openings around the crawfish trap bait guard 10 helps ensure that a larger number of crawfish will have simultaneous access to the bait.

A mounting panel 5 is provided, extending from the top collar 1 to the bottom piece 2, and provides a sufficiently stiff and robust surface to support mounting to the staking rod of the crawfish trap. One or more rod-mount members 6 are attached onto, into, or through the mounting panel 5, providing a sufficient grip on the staking rod to prevent the crawfish trap bait guard from slipping along the rod in use. The illustrated embodiment shows three rod-mount members 6 distributed along the mounting panel 5. A different number of properly configured rod mount members 6 could be used, such as one unit spanning a greater vertical distance, which would still provide the total contact area and gripping strength needed.

Figure 2:
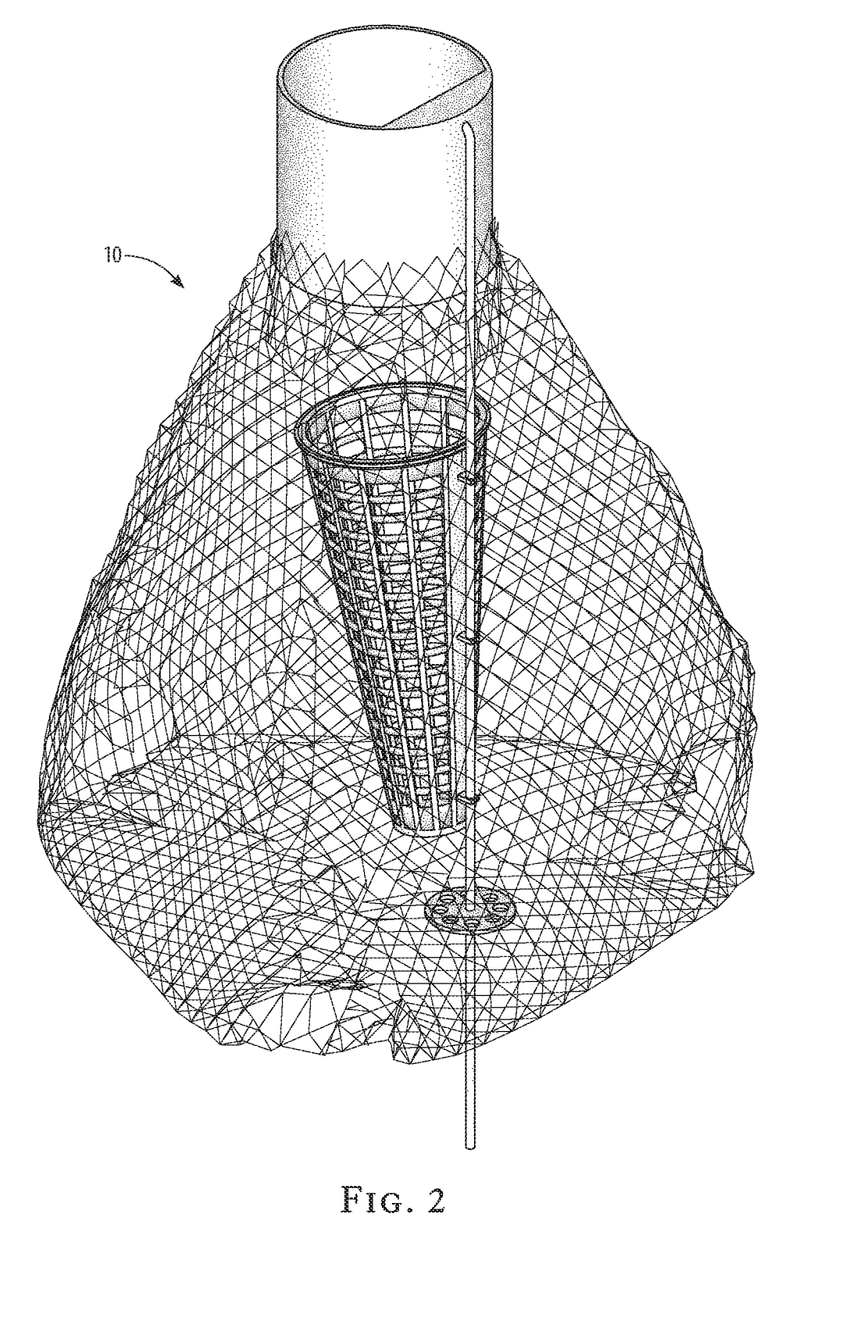
FIG. 2 is a perspective view of the crawfish trap bait guard of the invention mounted within a crawfish trap.
Figure 3:
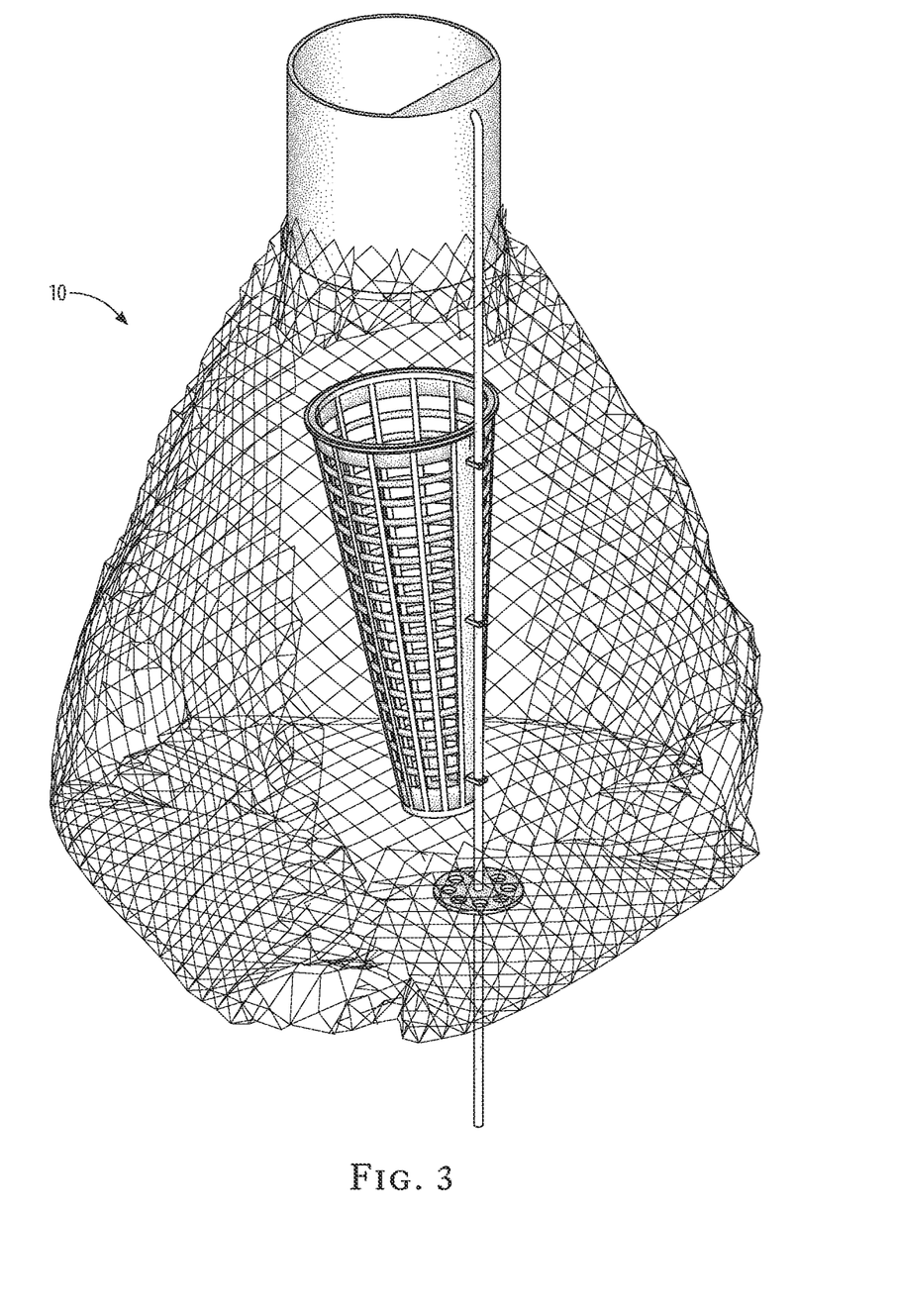
FIG. 3 is a perspective cutaway view of the crawfish trap bait guard of the invention mounted within a crawfish trap.

Referring to FIG. 2 and cutaway FIG. 3, in use, the crawfish trap bait guard 10 is installed within a standard crawfish trap, on the staking rod, such that it is raised up from the bottom of the trap, is not in contact with the wire mesh of the trap, is under the water surface, and is not excessively close to the above-water top of the trap.

It is an observed characteristic of cranes that, although the bird will place its head down into the above-water tubular top piece of the crawfish trap in order to steal bait, the bird is unwilling to place its head into yet another, underwater, inner enclosure, such as the crawfish trap bait guard 10 provides. Fish and amphibians are prevented from accessing the bait both by the wire mesh of the crawfish trap, which is effective against the larger ones, and by the size and configuration of the openings in the crawfish trap bait guard 10, where, lacking pincers, the fish or amphibian is unable to grasp and remove a piece of the bait. Crawfish outside the crawfish trap are held at too great a distance to reach into the crawfish trap bait guard 10.

Many other changes and modifications can be made in the system and method of the present invention without departing from the spirit thereof. I therefore pray that my rights to the present invention be limited only by the scope of the appended claims.

I claim:

1. A crawfish trap bait guard for a crawfish trap having mesh sides and a staking rod adapted for extending in the crawfish trap, the crawfish trap bait guard comprising:
    (i) a top collar defining a top opening of a predetermined size;
    (ii) a bottom piece having a predetermined size that is smaller than the size of the top opening;
    (iii) a plurality of spaced-apart longitudinal struts secured to and extending between the top collar and the bottom piece;
    (iv) a plurality of spaced-apart latitudinal struts extending between the top collar and the bottom piece, each of the latitudinal struts having an exterior surface and being connected to each of said longitudinal struts;
    (v) a mounting panel connected to an exterior surface of each of said latitudinal struts and extending vertically between said top collar and said bottom piece, said mounting panel having a longitudinal axis and being adapted to provide a surface to support mounting of the bait guard to the staking rod of the crawfish trap; and
    (vi) at least one rod-mount member affixed to said mounting panel and extending transversely to the longitudinal axis of the mounting panel, the at least one rod-mount member being adapted to mount the crawfish trap bait guard to the staking rod of the crawfish trap and to hold said crawfish trap bait guard above the bottom of the crawfish trap.

2. A crawfish trap bait guard for a crawfish trap having a bottom underwater to top above water orientation, a top trap opening, mesh sides and bottom, and a staking rod, the crawfish trap bait guard comprising:
    (i) a top collar defining an inner opening having a top perimeter;
    (ii) a bottom piece having a perimeter smaller than that of said top collar;
    (iii) longitudinal struts arrayed around the top perimeter of said top collar with a spacing between adjacent longitudinal struts of the longitudinal struts not exceeding one inch, and extending downward to said bottom piece;
    (iv) latitudinal struts arrayed between said longitudinal struts with a spacing between adjacent latitudinal struts of the latitudinal struts not exceeding one-half inch, each of said latitudinal struts having an exterior surface;

where said longitudinal struts and latitudinal struts define a tapered basket having openings, each opening not exceeding one inch by one-half inch in size;

(v) a mounting panel connected to an exterior surface of each of said latitudinal struts and extending between said top collar and said bottom piece, said mounting panel being adapted to provide a surface to support mounting of the bait guard to the staking rod of the crawfish trap; and (vi) at least one rod-mount member arrayed upon said mounting panel, adapted to mount to the staking rod of the crawfish trap, holding said crawfish trap bait guard above the bottom of the crawfish trap;

where said crawfish trap bait guard, in use, allows controlled access to the bait by crawfish inside the trap while preventing access by birds, fish, and crawfish outside the trap.

3. The crawfish trap bait guard of claim 2, where the inner opening defined by said top collar has a diameter of from four to six inches inclusive.

4. The crawfish trap bait guard of claim 2, where the inner opening defined by said top collar has an area of from nineteen to twenty inclusive square inches.

5. The crawfish trap bait guard of claim 2, where the inner opening defined by said top collar has an area of substantially twenty square inches.

6. The crawfish trap bait guard of claim 2, where said bottom piece has a diameter of from two to three inches inclusive.

7. The crawfish trap bait guard of claim 2, where said bottom piece has an area of from twelve to twenty inclusive square inches.

8. The crawfish trap bait guard of claim 2, where said bottom piece has an area of substantially twelve square inches.

9. The crawfish trap bait guard of claim 2, where the distance between said top collar and said bottom piece is from ten to fourteen inches inclusive.

10. The crawfish trap bait guard of claim 2, where the distance between said top collar and said bottom piece is substantially twelve inches.

11. The crawfish trap bait guard of claim 2, where the number of said longitudinal struts is twelve.

12. A crawfish trap bait guard method for use with a crawfish trap having a bottom underwater to top above water orientation, a top trap opening, mesh sides and bottom, and a staking rod, the crawfish trap bait guard method comprising:

(i) providing a crawfish trap bait guard apparatus, comprising:

(a) a top collar defining an inner opening having a top perimeter;

(b) a bottom piece having a perimeter smaller than that of said top collar;

(c) longitudinal struts arrayed around the top perimeter of said top collar with a spacing between adjacent longitudinal struts of the longitudinal struts not exceeding one inch, and extending downward to said bottom piece;

(d) latitudinal struts arrayed between said longitudinal struts with a spacing between adjacent latitudinal struts of the latitudinal struts not exceeding one-half inch, each of said latitudinal struts having an exterior surface;

where said longitudinal struts and latitudinal struts define a tapered basket having openings, each opening not exceeding one inch by one-half inch in size;

(e) a mounting panel connected to an exterior surface of each of said latitudinal struts and extending between said top collar and said bottom piece, said mounting panel being adapted to provide a surface to support mounting of the bait guard to the staking rod of the crawfish trap; and (f) at least one rod-mount member arrayed upon said mounting panel, adapted to mount to the staking rod of the crawfish trap;

(ii) mounting said crawfish trap bait guard apparatus within a crawfish trap, such that said crawfish trap bait guard is held underwater and is suspended above the bottom of the crawfish trap;

(iii) placing bait inside said crawfish trap bait guard apparatus; and (iv) allowing controlled access to the bait by crawfish inside the trap while preventing access by birds, fish, and crawfish outside the trap.

13. The crawfish trap bait guard method of claim 12, where the inner opening defined by said top collar has a diameter of from four to six inches inclusive.

14. The crawfish trap bait guard method of claim 12, where the inner opening defined by said top collar has an area of from nineteen to twenty inclusive square inches.

15. The crawfish trap bait guard method of claim 12, where the inner opening defined by said top collar has an area of substantially twenty square inches.

16. The crawfish trap bait guard method of claim 12, where said bottom piece has a diameter of from two to three inches inclusive.

17. The crawfish trap bait guard method of claim 12, where said bottom piece has an area of from twelve to twenty inclusive square inches.

18. The crawfish trap bait guard method of claim 12, where said bottom piece has an area of substantially twelve square inches.

19. The crawfish trap bait guard method of claim 12, where the distance between said top collar and said bottom piece is from ten to fourteen inches inclusive.

20. The crawfish trap bait guard method of claim 12, where the distance between said top collar and said bottom piece is substantially twelve inches.

21. The crawfish trap bait guard method of claim 12, where the number of said longitudinal struts is twelve.

* * * * *